US012380260B2

(12) United States Patent
Hanke et al.

(10) Patent No.: US 12,380,260 B2
(45) Date of Patent: Aug. 5, 2025

(54) MODELING AND SIMULATING MATERIAL MICROSTRUCTURES

(71) Applicant: Dassault Systèmes Americas Corp., Waltham, MA (US)

(72) Inventors: Felix Hanke, Bedford (GB); James Wescott, Bristol (GB); Sabine Schweizer, Angelbachtal (DE); Lalitha Subramanian, Newtown, PA (US); Kwan Skinner, Gilbert, AZ (US); Reinier Akkermans, Little Paxton (GB)

(73) Assignee: Dassault Systemes Americas Corp., Waltham, MA (US)

( * ) Notice: Subject to any disclaimer, the term of this patent is extended or adjusted under 35 U.S.C. 154(b) by 981 days.

(21) Appl. No.: 17/449,312

(22) Filed: Sep. 29, 2021

(65) Prior Publication Data

US 2022/0114309 A1    Apr. 14, 2022

Related U.S. Application Data

(60) Provisional application No. 63/089,087, filed on Oct. 8, 2020.

(51) Int. Cl.
*G06F 30/25*    (2020.01)
*G06F 111/10*    (2020.01)

(52) U.S. Cl.
CPC .......... *G06F 30/25* (2020.01); *G06F 2111/10* (2020.01)

(58) Field of Classification Search
CPC ...... G06F 30/25; G06F 2111/10; G06F 30/20; G06F 30/23; G06F 30/27; G06F 30/28; G06F 2111/00–2119/22; G16C 60/00
See application file for complete search history.

(56) References Cited

U.S. PATENT DOCUMENTS 8,260,589 B1    9/2012  Kumar
2014/0309975 A1    10/2014  Ohnishi
(Continued)

FOREIGN PATENT DOCUMENTS

JP    H09218787 A    8/1997
WO    WO-2016013641 A1 *    1/2016    ............. G01N 33/44
WO    2020/097216 A1    5/2020

OTHER PUBLICATIONS

Ciupan "Finite element analysis of the stress distribution in a representative elementary volume of mineral casting", MATEC Web of Conferences 178, 04010 (Year: 2018).*

(Continued)

*Primary Examiner* — Rehana Perveen
*Assistant Examiner* — Troy A Maust
(74) *Attorney, Agent, or Firm* — Hamilton, Brook, Smith & Reynolds, P.C.

(57) ABSTRACT

Embodiments generate computer based models, e.g., computer aided design (CAD) models, of materials. One such embodiment selects at least one section of a model representing a unit of a material. In turn, at least one physical or chemical property of the model is estimated based upon a proposed modification to the selected at least one section of the model and a proposed modification to a remainder of the model representing the unit of material. This selecting and estimating is iterated until the estimated at least one physical or chemical property conforms to a user specification of the at least one physical or chemical property. In this way, such an embodiment creates a model of a subject material that conforms to user specified physical and chemical properties.

17 Claims, 5 Drawing Sheets
(2 of 5 Drawing Sheet(s) Filed in Color)

(56) References Cited

U.S. PATENT DOCUMENTS

| | | | |
|---|---|---|---|
| 2015/0234377 A1 | 8/2015 | Mizikovsky | |
| 2017/0185707 A1* | 6/2017 | Rao | G06F 30/20 |
| 2017/0298714 A1 | 10/2017 | Ferreira et al. | |
| 2018/0319087 A1* | 11/2018 | Eom | B29C 64/106 |
| 2020/0004924 A1* | 1/2020 | Wang | G06F 30/17 |
| 2020/0227142 A1 | 7/2020 | Nichols et al. | |
| 2021/0294937 A1* | 9/2021 | Kalariya | G06F 30/23 |
| 2022/0067249 A1* | 3/2022 | Steingrimsson | G06F 30/28 |

OTHER PUBLICATIONS

Pireddu et al. "Scaling-up Simulations of Diffusion in Microporous Materials" (Year: 2019).*

Röding et al. "Predicting permeability via statistical learning on higher-order microstructural information" Sep. 17, 2020 (Year: 2020).*

Kanit et al. "Determination of the size of the representative volume element for random composites: statistical and numerical approach" (Year: 2003).*

Yuan, J., et al., "On mechanisms and models of multi-component gas diffusion in porous structures of fuel cell electrodes", International Journal of Heat and Mass Transfer, vol. 69, 2014, pp. 358-374, (2013).

Onodera Mari, et al., Theoretical Analysis of Device Characteristics by Multi-Scale Simulation of Dye-Sensitized Solar Cells, Proceedings of the 50th Battery Symposium, the Committee of Battery Technology, the Electrochemical Society of Japan, Nov. 30, 2009, p. 268.

Li, C., et al., "Pre-Constructed Interface: an Easy Approach for Generating Nano-Scale-Device Atomistic Models", Journal of Computer-Aided Design & Computer Graphics, vol. 28 No. 10, Oct. 15, 2016.

Ngandjong, Alain C. et al: "Multiscale Simulation Platform Linking Lithium Ion Battery Electrode Fabrication Process with Performance at the Cell Level", Journal of Physical Chemistry Letters, vol. 8, No. 23, Dec. 7, 2017.

Shodiev, Abbos et al: "4D-resolved physical model for Electrochemical Impedance Spectroscopy of Li(Ni1—x—yMnxCoy)O2-based cathodes in symmetric cells: Consequences in tortuosity calculations", Journal of Power Sources, vol. 454, Feb. 13, 2020.

Bertei, A et al: "Microstructural modeling for prediction of transport properties and electrochemical performance in SOFC composite electrodes", Chemical Engineering Science, vol. 101, Jun. 21, 2013.

Extended European Search Report for EP 21 20 0922 dated Feb. 22, 2022.

* cited by examiner ately sized radius, with some lattice properties (face centered cubic packing, for non-limiting example). Step 2 is reiterated for each bead location until a desired number of beads is placed in the selected section.

MODELING AND SIMULATING MATERIAL MICROSTRUCTURES

RELATED APPLICATION

This application claims the benefit of U.S. Provisional Application No. 63/089,087, filed on Oct. 8, 2020. The entire teachings of the above application are incorporated herein by reference.

BACKGROUND

Existing approaches for generating models of, and simulating material microstructures, come in two general varieties, macroscale modeling and mesoscale modeling. For macroscale modeling, the elements are defined in a discretized simulation box as either 'material' or not 'material.' This macroscale modeling provides a way to account for the microstructure in a macroscale model. Mesoscale modeling fills the simulation cell with spherical particles of different sizes and provides a mesostructured approximation. However, with mesoscale modeling, in the end, the model only has spherical particles. This is a significant approximation. Both macroscale and mesoscale methods produce idealized structures which are most often not representative of real world materials and their derived properties. Atomistic approaches exist to generate microporous structure models, but at the atomistic level the treatable system size and time scale is limited.

SUMMARY

Thus, functionality is needed to accurately model and simulate the microstructure of materials. Embodiments provide such functionality. Embodiments of the present invention provide an efficient method to generate chemically and physically realistic computer models for the porous microstructure of materials. This is useful to improve the simulation of material performance at the nanometer scale and larger. Amongst other examples, embodiments can be implemented to model and simulate battery electrodes. Moreover, embodiments can be employed for modeling and simulating any material that is porous on the nanoscale, such as coatings, composites, formulations, enhanced oil recovery, and catalysis, amongst other examples. In embodiments, after the model is generated, the generated model can be employed to simulate real world use of the material the model represents. In an example embodiment the constructed model is used in a simulation according to principles known to those of skill in the art.

Embodiments can also be used to better model and simulate real world material structures comprised of more than one material (e.g., a material with a surface coating or heterogeneous structures, amongst other examples).

An example embodiment provides a computational method that executes an iterative and stochastic process to obtain a realistic computer model of the microstructure of a material. Such an embodiment starts with an empty box representing a three-dimensional (3D) repeat unit of the material to be modeled, and one or more small sections of that box are randomly selected (step 1). Next, the randomly selected sections of that box are filled with beads representing the material of a predetermined density (step 2). Physical characteristics, e.g., porosity (percentage solid and percentage fluid) and tortuosity, of the resulting model are then computed (step 3). Depending on the computed physical characteristics, the result of step 1 is used and one or more new sections of the box are randomly selected to represent the material and it is filled with beads (repeating steps 1 and 2). This process is repeated until a desired physical characteristic is achieved. Different models can be generated by repeating the above process so as to get a final statistically averaged model of a porous material that has the desired physical characteristic (i.e., consistent with real-world known material characteristics for non-limiting example).

An alternative embodiment iterates steps 1 and 3, and performs step 2, creating the actual model, after an appropriate design is identified. In such an embodiment, one or more small sections of the box are randomly selected (step 1). In turn, physical properties of a model where the selected selections are hypothetically filled with a solid and the non-selected area is a fluid (e.g., gas and/or liquid) are estimated. If the estimated physical properties conform to desired physical properties (physical properties of interest), the method then continues (associating or otherwise filling the selected section with beads) and creates the model. If the desired physical properties do not meet the desired standard, the process repeats.

Yet another embodiment is directed to a computer-implemented method for generating a model of a material. Such an embodiment begins by selecting at least one section of a model representing a unit of a material. Next, at least one physical property of the model is estimated based upon: (i) a proposed modification to the selected at least one section of the model, and (ii) a proposed modification to a remainder of the model representing the unit of material. If the estimated at least one physical property meets a requirement, e.g., a user or system specified value for the at least one property, the method ends (if a model was created to estimate the at least one physical property) or the method continues by creating the model in accordance with the proposed modifications. If the estimated property does not meet the requirement, the selecting and estimating steps are iterated until the estimated at least one physical property conforms to a user specification of the at least one physical property. Embodiments can estimate any desired physical properties (physical properties of interest) of the model. For instance, embodiments can consider porosity and/or tortuosity.

According to an embodiment, estimating the at least one physical property of the model includes updating the model in accordance with the proposed modification to the selected at least one section and in accordance with the proposed modification to the remainder of the model. In such an embodiment, the model is updated by filling the selected at least one section of the model with beads representing material of the at least one section and filling the remainder of the model representing the unit of material with beads representing material of the remainder of the unit of the material. Moreover, in such an embodiment, the at least one physical property is estimated by computing the at least one physical property using the updated model.

According to an embodiment, the beads filling the selected at least one section represent a solid. In another embodiment, the beads filling the remainder represent a fluid, e.g., a liquid or a gas. In yet another embodiment, the at least one section is composed of a first closed volume and a second closed volume that encompasses the first closed volume. In such an example embodiment, filling the selected at least one section of the model with beads representing material of the at least one section includes filling the first closed volume with beads representing material of the first closed volume and filling the second closed volume with beads representing material of the second closed volume. In an embodiment, the beads filling the second closed volume represent a coating that encompasses the first closed volume.

In an alternative embodiment of the method, the at least one physical property of the model is estimated using a template. In such an embodiment, if the estimated physical property meets a requirement, the method updates the model in accordance with the proposed modification to the selected at least one section and in accordance with the proposed modification to the remainder of the model. However, if the estimated physical property (estimated using the template) does not meet a requirement, i.e., a user specification, such an embodiment continues by iterating the steps of selecting and estimating until the estimated at least one physical property conforms to a user specification of the at least one physical property. Once the iterating determines that the estimated physical property meets the requirement, the model is updated or created in accordance with the proposed modification to the selected at least one section and the proposed modification to the remainder of the model. In such an embodiment, the model is updated by filling the selected at least one section of the model (which may include all of the sections selected throughout the iterations) with beads representing material of the at least one section and by filling the remainder (the volume of the model not including the selected sections) of the model representing the unit of material with beads representing material of the remainder of the unit of the material.

In embodiments, the unit can be a three-dimensional (3D) repeat unit. In another example embodiment, the 3D repeat unit is cubic or rectangular (e.g., cuboid or rectangular prism). According to an embodiment, the selected at least one section is a closed volume. Example closed volumes that can be utilized in embodiments include spheres, cylinders, and/or ellipsoids.

Yet another embodiment is directed to a system that includes a processor and a memory with computer code instructions stored thereon. In such an embodiment, the processor and the memory, with the computer code instructions, are configured to cause the system to implement any embodiments or combination of embodiments described herein.

Another embodiment of the present invention is directed to a cloud computing implementation for generating a model of a material. Such an embodiment is directed to a computer program product executed by a server in communication across a network with one or more clients, where the computer program product comprises instructions which, when executed by one or more processors, causes the one or more processors to implement any embodiments described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
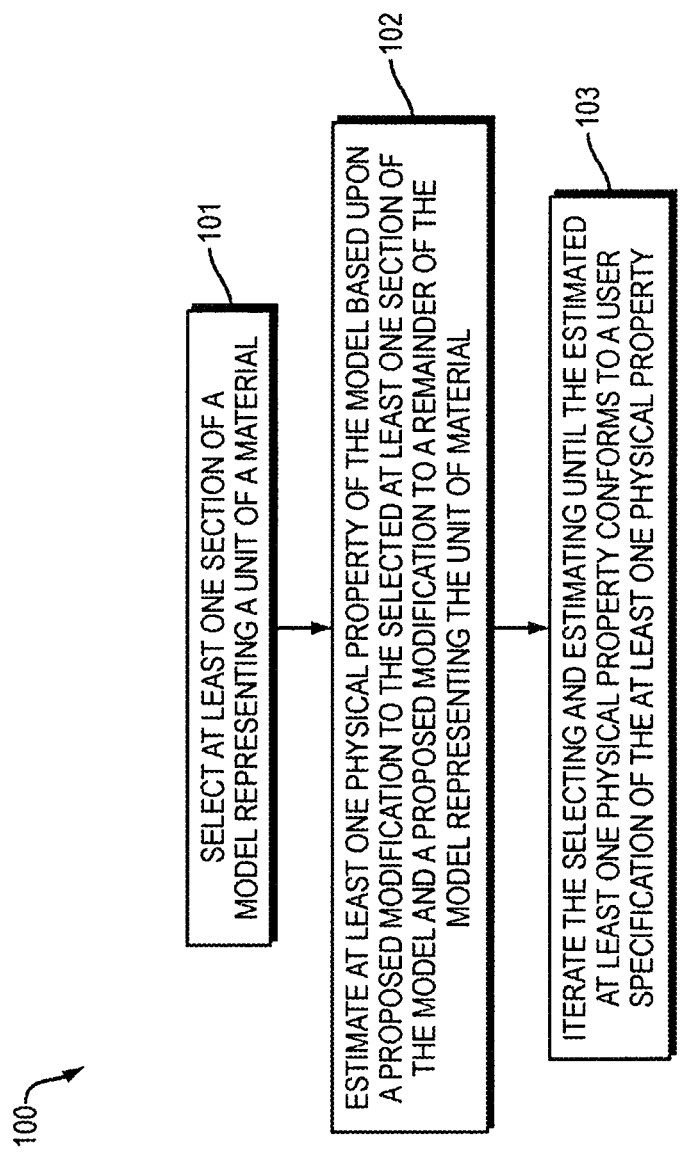
FIG. 1 is a flowchart of a method for generating a model of a material according to an embodiment.

A description of example embodiments follows.

The teachings of all patents, published applications and references cited herein are incorporated by reference in their entirety.

Embodiments can be used for any modeling and simulation where microstructure detail is helpful to understand product performance and behavior (e.g., aging, product life cycle, other physical or chemical properties, etc.). For non-limiting example, embodiments model and enable simulation of coatings, composites, formulations, enhanced oil recovery, and catalysis, amongst other examples. Specific parameters can be developed based on the material of interest for the foregoing applications. These parameters can be utilized in the embodiments described herein to provide modeling and simulation for these applications, e.g., coatings, composites, formulations, enhanced oil recovery, and catalysis. According to an embodiment, application-specific parameters are parameters describing the interaction between beads, where each bead represents a different section of material. In an example embodiment, interaction parameters constitute a force field for a mesoscale dynamics simulation, from which properties such as average porosity and tortuosity may be measured, as described hereinbelow. Interaction parameters can be defined per bead type, where each bead type represents one well-defined set of atoms (or particles) within the material (such as a solid, liquid, or gas). This so-called 'coarse-graining' of atoms into beads allows one to simulate larger length and time scales than what would typically be possible in all-atom simulations. For instance, embodiments can be employed to simulate battery materials at the mesoscale level rather than at the atomistic level. Such embodiments provide key insights on electrode porosity during charging and discharging of batteries.

One improvement that embodiments provide over previously available methods is building material models (models of materials) that do not result in a superposition of spheres—which is how computer models work to date. Instead, embodiments generate a detailed computational model of a microstructure that can be tailored to exactly represent structures and properties that are observed in experiments (e.g.; SEM data, BET data, composition). Specifically, the move from spherical particle approximations (i.e., the existing methods which model materials using only spheres) to realistic particle structure provided by embodiments allows for more accurate models that are representative of physically measured properties. Embodiments of the invention can be used automatically with minimal user input, which allows for the rapid exploration of design parameter spaces and an improved user experience. Embodiments of the present invention can be used as a generic tool in other workflows, e.g., simulation workflows, and on existing modeling and simulation platforms. Embodiments can be implemented in existing software suites and packages. In such implementations, the existing software is modified so as to perform the functionality described herein, e.g., the method 100.

Embodiments provide functionality for 3D nanoscale modeling and simulation of materials, such as, battery electrode materials. FIG. 1 is a flowchart of one such computer implemented method 100 for generating a model of a material of interest. The method 100 starts at step 101 by selecting at least one section of a model representing a unit of a subject material. In the method 100, the unit of material can be a 3D repeat unit. In embodiments of the method 100, the 3D repeat unit can be cubic or rectangular. In an example embodiment of the method 100, the at least one selected section is a closed volume. Example closed volumes that can be utilized in the method 100 include spheres, cylinders, and/or ellipsoids.

To continue, at step 102, at least one physical property of the model is estimated based upon a proposed modification to: (1) the at least one section of the model selected at step 101 and (2) a proposed modification to a remainder of the model representing the unit of material. Embodiments can estimate any desired physical properties of the model at step 102. For instance, embodiments can estimate porosity and/or tortuosity.

In an embodiment of the method 100, estimating the at least one physical property of the model at step 102 includes updating the model in accordance with the proposed modifications (the modifications to the at least one section selected at step 101 and the proposed modification to the remainder of the model). In such an embodiment, the model is updated at step 102 by filling the selected at least one section of the model with beads representing material of the selected at least one section and filling the remainder of the model representing the unit of material with beads representing material of the remainder of the unit of the material. According to an embodiment, the beads are mesoscale models where each bead represents a group of atoms. In an embodiment, the bead representations themselves are implemented using standard techniques (i.e., software programming and supporting data structures) known to those of skill in the art of materials modelling. Moreover, in such an embodiment, at step 102, the at least one physical property is estimated by computing the at least one physical property using the updated model. In such an embodiment, a new model is generated at every iteration of step 102. According to an embodiment, the beads filling the at least one section represent a solid. In another embodiment, the beads filling the remainder represent a fluid.

As described herein, physical properties are computed at step 102. Example physical properties that may be computed a step 102 include porosity (denoted by $\epsilon$) and tortuosity denoted by $\tau$). In an embodiment, porosity can be estimated by computing a 'volume surface' which splits one section of material from another (e.g. electrode from electrolyte in a battery simulation). Such a surface can be obtained using standard computational techniques. In an embodiment, the surface separates the simulation cell into volume occupied by each material. The volume occupied by the material (surface) can be set in relation to the total volume of the simulation cell to obtain the porosity. The tortuosity $\tau$ can be obtained by calculating the diffusion coefficient of beads in the bulk fluid ($D_0$) and in the actual structure ($D_e$) with porosity $\epsilon$. The tortuosity then follows as $=\sqrt{D_0 \epsilon/D_e}$. The diffusion coefficient can be calculated from the mean-square displacement of beads as measured in a mesoscale dynamics simulation for a given force field. In an embodiment, the diffusion coefficient can be calculated as described in Jinliang Yuan, Bengt Sundén, On mechanisms and models of multi-component gas diffusion in porous structures of fuel cell electrodes, International Journal of Heat and Mass Transfer, Volume 69, 2014, pages 358-374, the contents of which are incorporated herein by reference.

In yet another embodiment of the method 100, the at least one section selected at step 101 is composed of a first closed volume and a second closed volume encompassing the first closed volume. In such an example embodiment, at step 102, filling the selected at least one section of the model with beads representing material of the at least one section includes filling the first closed volume with beads representing material of the first closed volume and filling the second closed volume with beads representing material of the second closed volume. In such an embodiment, the beads filling the second closed volume represent a coating encompassing the first closed volume.

Returning to FIG. 1, if, at step 102, the estimated at least one physical property meets a requirement, e.g., a user or system specified value, the method ends (if an updated model was created and saved in computer memory at step 102 to estimate the at least one physical property) or the method continues by creating the model in accordance with the proposed modifications. However, if the estimated property does not meet the requirement, the method moves to step 103 where the selecting (step 101) and estimating (step 102) are iterated, i.e., repeated, until, at step 102 of a given iteration, the estimated at least one physical property conforms to a user specification of the at least one physical property. During each iteration, at step 101, new sections of the model representing the unit of material are selected and, at step 102, properties are estimated based on a proposed modification to all of the sections that have been selected throughout the iterations.

In an alternative embodiment of the method 100, at least one physical property of the model is estimated at step 102 using a template, such as the templates 222 and 332 described hereinbelow in relation to FIGS. 2 and 3. As such, in embodiments, property calculations can be based on templates or based on models derived from templates. According to an embodiment, porosity is calculated as described hereinabove by computing a 'volume surface' which splits one section of material from another and tortuosity $\tau$ can be obtained by calculating the diffusion coefficient of beads in the bulk fluid ($D_0$) and in the actual structure ($D_e$) with porosity $\epsilon$. In such an embodiment, the template provides the surface. According to an embodiment, once the estimated physical property meets a requirement, the method updates/creates the model in accordance with the proposed modification to the selected at least one section and in accordance with the proposed modification to the remainder of the model. However, if at step 102, the physical property estimated using a template does not meet a requirement, i.e., a user specification, the method moves to step 103 where the selecting (step 102) and estimating (step 103) are iterated until the estimated at least one physical property conforms to a user specification of the at least one physical property. Once the estimated physical property meets the requirement, the model is updated in accordance with the proposed modification to the selected at least one section and in accordance with the proposed modification to the remainder of the model. In such an embodiment, the model is updated by filling the selected at least one section of the model with beads representing material of the at least one section and by filling the remainder of the model representing the unit of material with beads representing material of the remainder of the unit of the material. In this embodiment, a single model is generated after a design (the proposed modification to the selected at least one sections and the proposed modification to the remainder of the model, which is reflected in the template) is identified that meets the requirement.

Figure 2:
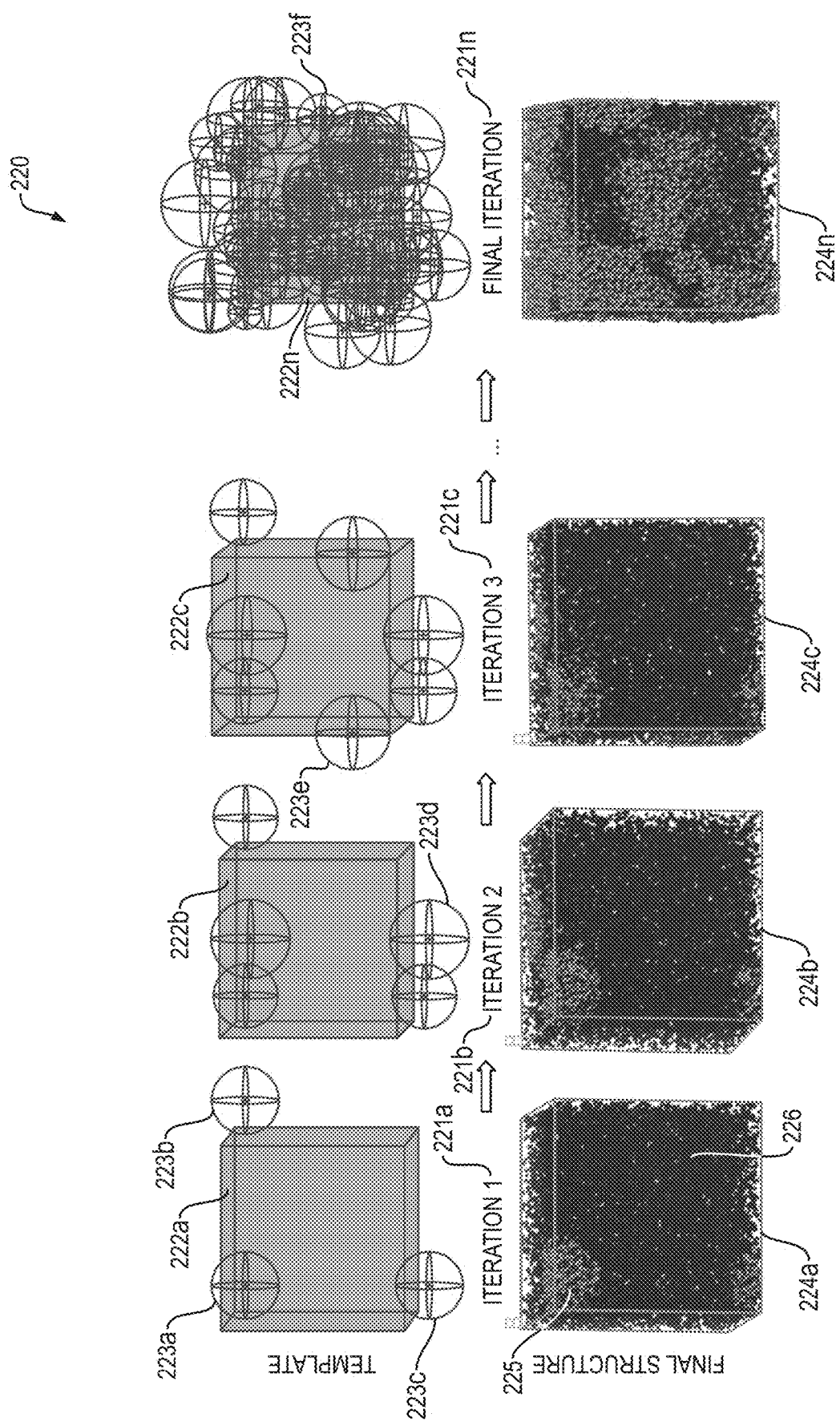
FIG. 2 illustrates steps of an embodiment for building a model of a material.

FIG. 2 illustrates steps of a method 220 to build a model of a porous microstructure material, such as the active material in a battery electrode or separator. The process 220 uses bead-type simulations (mesoscale models, or submodels) where each bead represents a group of atoms. According to an embodiment, the bead representations themselves are implemented using standard programming techniques known to those of skill in the art of materials modelling. In the overall model built by the process 220, beads may be connected to simulate solid parts of the material. The method 220 is performed iteratively until an overall model is generated that conforms to a user requirement, such as a user desired physical property of the material.

The method 220 utilizes model templates 222a, 222b, 222c, and 222n (generally referenced as 222. In an embodiment of the method 220, the size of the model template 222 is selected before beginning the iterative process of the method 220. In another embodiment, templates 222 are a default size. According to an embodiment, a template 222 is a three-dimensional (3D) repeat unit box representing the material. It is noted that the template may be cubic or rectangular (e.g., cuboid or rectangular prism). Another embodiment, before beginning the iterative process, also selects the step size of each iteration 221a-n by selecting the number of new regions 223 to select each iteration 221a-n.

Step 1 of the first iteration 221a begins with selecting the new regions 223a-c of the model template 222a to be filled with a specific material. In FIG. 2, the regions 223a-c are selected during the first iteration 221a. It is noted that in FIG. 2 the regions 223a-c are depicted as being spherical, but embodiments of the present invention are not so limited. The selected regions 223a-c may be any closed volume, such as cylinders, ellipsoids, or cubes. It is also noted that the size and position of the regions 223a-c that are selected at step 1 may be randomly chosen or may be based upon user selected or default settings.

If a selected region crosses the boundary of the template box 222a (e.g., the region 223b), then it is assumed to reflect from the other side. In other words, the method 220 applies periodic boundary condition rules. As such, if a selected region crosses the template boundary then a required number of copies are made to ensure periodic continuity. To illustrate, consider the region 223b which is partially outside the template box 222a. In operation, the template boxes 222 are repeat units and, thus, any number of boxes are combined, i.e., connected next to each other, to represent the entire material and object being simulated. To ensure periodic continuity, each template box is updated to reflect the selected regions that cross the boundary. Thus, in this example illustration, the portions of the selected region 223b that are outside the boundary of the template box 222a are placed inside every adjacent box that the sphere (selected region 223b) overlaps. In this way, when the template boxes are connected to make a model of the entire object being simulated, e.g., a battery terminal with a material represented by the models created by embodiments, the portions of the region 223b that are outside the template box 222a, are inside the template boxes adjacent (connected to) the box 222a.

To continue, step 2 of the iteration 221a creates the model 224a by filling the solid material region(s) (corresponding to the selected template regions 223a-c) with solid beads (e.g., the yellow area 225 in FIG. 2). It is noted that the beads in FIG. 2 are depicted as being spherical, but embodiments are not so limited and the beads may be shaped differently. For instance, in an embodiment, the beads are elliptical. In addition, during the iteration 221a the remainder (corresponding to the volume of the unit 222a not including the selected regions 223a-c) of the model 224a is filled with solvent beads (e.g., the purple area 226 shown in FIG. 2). At this point (step 2 of the iteration 221a), the model 224a is now a complete representation of the material being modeled.

The process 220 may optionally include a step (step 2a), that cross-links beads according to a distance criterion. Such cross-linking creates continuous solid particles representing the solid active material.

Next (step 3 of the iteration 221a), physical properties, e.g., porosity, of the model 224a are computed and compared against requirements. If the physical properties meet the requirements, the process 220 ends, otherwise the process 220 iterates until a model is generated that meets the requirements. The model that meets the requirements is stored and, in turn, can be used in simulations to simulate real world use of the material that the model represents. Storing the model may include storing in a data structure in computer memory: (a) coordinates of each selected region 223, (b) indications of types of beads used to fill the model (e.g., binder, solid, fluid), (c) linking information between beads, (d) indications of and values representing the physical or chemical properties, e.g., porosity, of the model, and (e) template (box) size, amongst other examples.

As depicted in FIG. 2, the process 220, after the iteration 221a, includes the iterations 221b-n. In each iteration 221b-n, new regions of template 222, e.g., the regions 223d-f (amongst others), are selected. At step 2 of each iteration 221b-n, the models 224b-n are created by filling the solid material region(s) of the models 224b-n (corresponding to the selected template regions) with solid beads, shown in yellow in FIG. 2, and filling the remainders of the models 224b-n with solvent beads (purple color shown in FIG. 2). At this point (step 2) of the iterations 221b-n, the models 224a-n are now a complete representation of the material being modeled (subject material). At step 3 of each iteration 221b-n, physical properties of the models 224b-n are computed and compared against requirements. In the iterations 221b and 221c, the respective models 224b and 224c do not meet requirements and the process 220 moves to a next iteration. However, in the iteration 221n the physical properties and chemical properties of the model 224n as then computed meet the requirements and the process 220 ends.

It is noted that the process 220 is described herein as iterating three steps: (Step 1) selecting regions 223 of a model template 222, (Step 2) creating or generating a model from the template by filling model regions corresponding to the selected template regions with beads representing a solid material and filling the remainder with beads representing a fluid, and (Step 3) calculating physical and chemical properties of the created model and determining if the created model (and current model behavior) meets requirements. However, the process 220 can be modified so that a model, e.g., the models 224a-n, are not created every iteration and, instead, only the final model 224n is created and saved to computer memory. In such an alternative implementation, step 1 of each iteration selects regions of a model template. However, at step 2 of this alternative implementation, physical properties of a proposed model, i.e., a model that is not yet created, are estimated based on the template, e.g., the unit 222a, and the selected template regions, e.g., the regions 223a-c. If the estimated physical properties meet the requirements, the iterating ends and the model is created or generated by filling the solid material region(s) (corresponding to the selected template regions) with solid beads and filling the remainder (the volume of the model not including the corresponding selected template regions) of the model with beads representing a fluid.

To illustrate, in the method 220, the templates, e.g., the units 222a-n with their selected regions (generally referenced 223) are all created and properties of these templates are determined. The properties of the templates in the iterations 221a-c do not meet requirements and, thus, the models 224a-c are not built. However, the template in the iteration 221n meets requirements and the model 224n is created as described herein.

Figure 3:
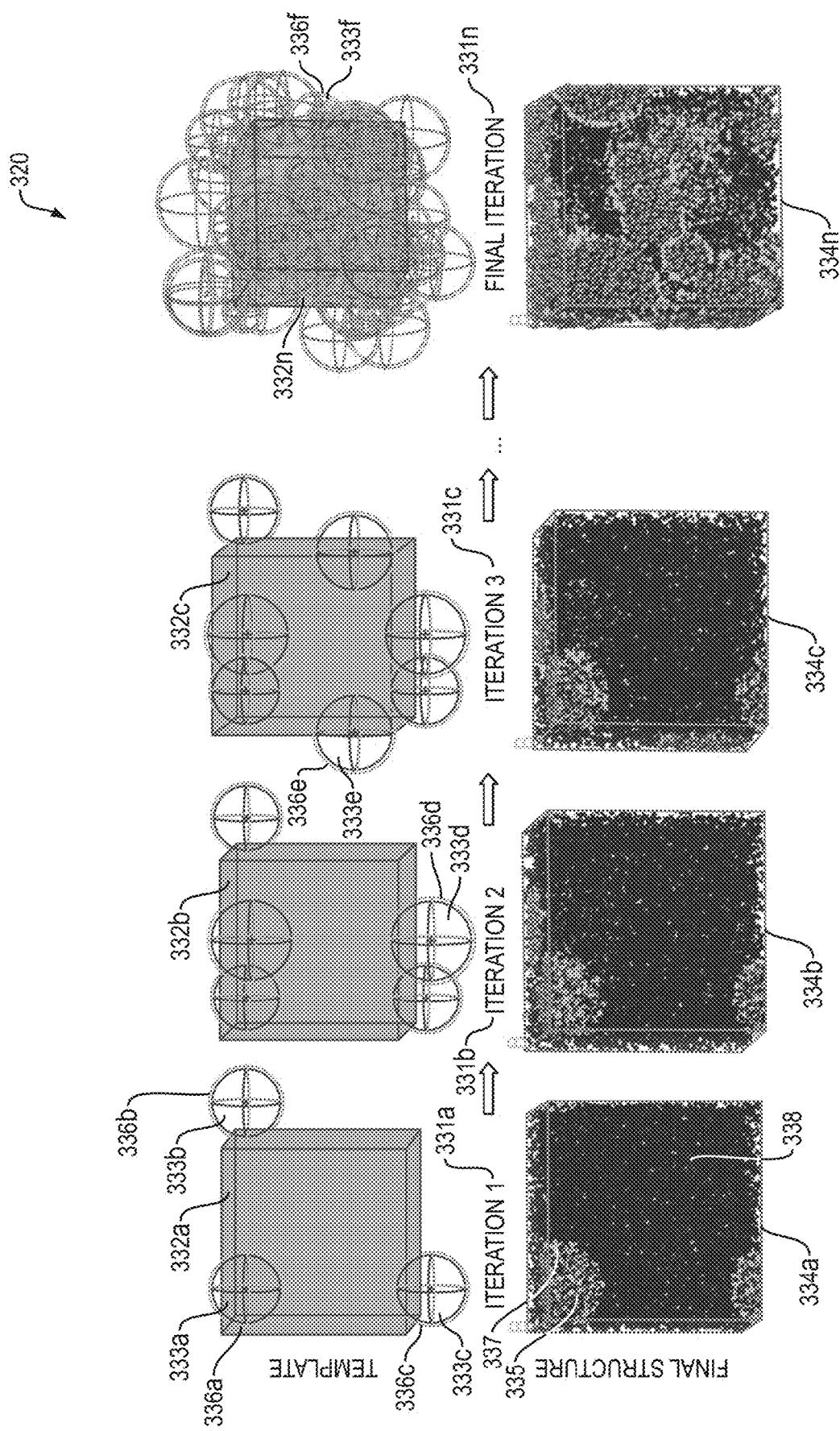
FIG. 3 illustrates steps of a process for building a microstructure model of a material with a coating in one embodiment.

FIG. 3 illustrates steps of an iterative method 330 for building a model of a porous microstructure material with a coating. The method 330 can be used to simulate materials with a coating that mechanically binds particles, provides conductivity, and/or provides a solid electric interphase (i.e., an entire phase of material). The process 330 uses bead-type simulations (mesoscale models, or submodels) where each bead represents a group of atoms. In the models, e.g., 334a-n, built by the process 330, beads can be connected to simulate solid parts of the material. The method 330 is performed iteratively until a model is generated that conforms to a user requirement, such as a user desired physical property of the material the model represents.

The method 330 utilizes model templates 332a, 332b, 332c, and 332n (generally referenced as 332). In an embodiment of the method 330, the size of the model template 332 is selected before beginning the iterative process of the method 330. In another embodiment, the template 332 is a default size. In an embodiment, the template size is maintained for the iterations 331a-n. However, the method 330 can be repeated using different sized templates. According to an embodiment, a template 332 is a three-dimensional (3D) repeat unit box representing the material.

Step 1 of the first iteration 331a begins with selecting one or more new regions 333a-c of a model template 332a to be filled with solid material. In FIG. 3, the regions 333a-c are selected during the first iteration 331a. In addition to selecting the regions 333a-c, at step 1 of the iteration 331a, additional regions 336a-c (shown in green) surrounding or enveloping the initially selected regions 333a-c are created. The additional regions 336a-c will contain the "coating" or second material type. It is noted that in FIG. 3 the regions 333a-c are depicted as being spherical, but embodiments of the present invention are not so limited. The selected regions 333a-c may be any closed volume, such as cylinders, ellipsoids, or cubes. It is also noted that the size and position of the regions 333a-c that are selected at step 1 of the iterations may be randomly chosen or may be based upon user selected or default settings.

If a selected region crosses the boundary of the box 332a (e.g., the region 333b), then it is assumed to reflect from the other side. In other words, the method 330 applies periodic boundary condition rules. As such, if a selected region crosses the template boundary, then a required number of copies are made to ensure periodic continuity. To illustrate, consider the region 333b that extends outside the template box 332a. In operation, the template boxes 332 are repeat units and, thus, any number of boxes are combined, i.e., connected next to each other, to represent the entire material and object being simulated. To ensure periodic continuity, each box is updated to reflect the selected regions that cross the boundary. Thus, in this example, the portions of the selected region 333b that are outside the boundary of the template box 332a are placed inside every other template box. In this way, when template boxes are connected to make a model of the entire object being simulated, the portions of the region 333b that are outside the box 332a are inside the template boxes adjacent (connected to) the box 332a.

To continue, (step 2 of the iteration 331a of the process 330) creates the model 334a by first filling the solid material region(s) (corresponding to the selected regions 333a-c) with solid beads (e.g., the yellow area 335 in FIG. 3). Next, model regions corresponding to the regions 336a-c surrounding the regions 333a-c are filled with beads representing the coating. These coating beads are depicted in pink, e.g., the area 337, in FIG. 3. In this way, in the method 330, the inner spheres 333a are first filled and, then, the area between the inner spheres 333a-c and outer spheres 336a-c are filled with beads representing the coating. In addition, at step 2 of the iteration 331a, the remainder (corresponding to the volume of the template unit 332a not including the selected regions 333a-c and created coating regions 336a-c) of the model 334a is filled with solvent beads (e.g., the purple area 338 shown in FIG. 3). At this point (step 2), the model 334a is now a complete representation of the subject material being modeled.

The process 330 may optionally include a step (step 2a), that cross-links beads according to a distance criterion. Such cross-linking creates continuous solid particles representing the solid active material.

Next (step 3 of the iteration 331a), properties, e.g., physical and/or chemical properties, of the model 334a are computed and compared against requirements. If the physical properties meet the requirements, the process 330 ends, otherwise the process 330 iterates until a model is generated that meets the requirements. The model that meets the requirements is stored in computer memory and, in turn, can be used in simulations to simulate real world use of the material that the model represents. Storing the model may include storing in a data structure in computer memory: (a) coordinates of each selected region 333, (b) indicia of types of beads used to fill the model (e.g., binder, solid, fluid), (c) linking information between beads, (d) indicia and/or measurement values of the physical or chemical properties, e.g., porosity, of the model, and (e) template (box) size, amongst other examples.

As depicted in FIG. 3, the process 330, after the iteration 331a, performs the iterations 331b-n. In each iteration 331b-n, new regions of templates 332b-n, e.g., the regions 333d-f (amongst others), are selected and regions surrounding the selected regions, e.g., the regions 336d-f (amongst others), are created. At step 2 of each iteration 331b-n, the models 334b-n are created by filling the solid material region(s) (corresponding to the selected template regions) with solid beads, shown in yellow in FIG. 3, and filling the model regions, e.g., corresponding to regions 336d-f, surrounding the selected regions with beads representing the coating. Moreover, the remainders of the models 334 are filled with solvent beads (purple color shown in FIG. 3). At this point (step 2) of the iterations 331b-n, the models 334a-n are now a complete representation of the material being modeled. At step 3 of each iteration 331b-n, physical properties of the models 334b-n are computed and compared against requirements. In the iterations 331b and 331c, the models 334b and 334c do not meet requirements and the process 330 moves to a next iteration. However, in the iteration 331n the physical properties and chemical properties of the model 334n meet the requirements and the process 330 ends.

It is noted that the process 330 is described herein as iterating three steps: (Step 1) selecting regions 333 of a model template 332 and creating regions 336 surrounding the selected regions, (Step 2) creating or generating a model by filling model regions corresponding to the selected template regions with beads representing a solid material, filling the created coating regions surrounding the selected regions with beads representing the coating, and filling the remainder with beads representing a fluid, and (Step 3) calculating physical properties and chemical properties of the created model and determining if the created model meets requirements. However, the process 330 can be modified so that a model, e.g., the models 334a-n, are not created every iteration and, instead, only the final model 334n is created and saved to computer memory. In such an alternate implementation, step 1 of each iteration selects regions of a model template and creates regions surrounding the selected regions. However, at step 2 of this alternative implementation, physical properties of a proposed model, i.e., a model that is not yet created, are estimated based on the template, e.g., the unit 332a, the selected template regions, e.g., the regions 333a-c, and the surrounding regions 336a-c. In an embodiment, the template-based estimation is performed as described hereinabove. For example, porosity is calculated by computing a 'volume surface' which splits one section of material from another and tortuosity $\tau$ is obtained by calculating the diffusion coefficient of beads in the bulk fluid ($D_0$) and in the actual structure ($D_e$) with porosity $\epsilon$. In an embodiment, the template defines a certain amount of solid volume, e.g., the solid volume is defined by the selected regions, the porosity and tortuosity is computed by comparing the defined amount of solid volume to the total volume of the template. If the estimated properties (the physical and/or chemical properties estimated using the template) meet the requirements, the iterating ends and the model is created by first filling the solid material region(s) (corresponding to the selected template regions) with solid beads (e.g., the yellow area in FIG. 3), second, filling regions corresponding to the created coating regions surrounding the selected template regions, (e.g., the pink areas in FIG. 3) and, third, filling the remainder (the volume of the model not including the selected regions and created regions) of the model 334 with solvent beads.

To illustrate this alternative implementation, in the method 330, the templates, e.g., the units 332a-n with their selected regions (e.g. 333 generally) and created regions (e.g., 336 generally) surrounding the selected regions are all generated and properties of these templates are determined. In the iterations 331a-c the properties of the templates 332 do not meet requirements and, as such, the models 334a-c are not built. However, in the iteration 331n the template 332n with the selected regions and created regions (e.g., 333f and 336f) meets requirements and the model 334n is created as described herein.

Another embodiment of the present invention is directed to a computer-implemented process for creating a CAD model of a porous microstructure. Such an embodiment first identifies a desired porosity of the target porous microstructure material. Next, an empty 3D repeat unit of the material to be modeled is created within a CAD program and small portions of the empty repeat unit are selected. In turn, the selected small portions of the empty repeat unit are filled with models of solid beads and the remainder of the repeat unit is filled with models of solvent beads. The porosity of the filled repeat unit is calculated and the calculated porosity of the filled repeat unit is compared to a required porosity of the target porous microstructure material. This process repeats until desired porosity for the repeat unit is reached.

Figure 4:
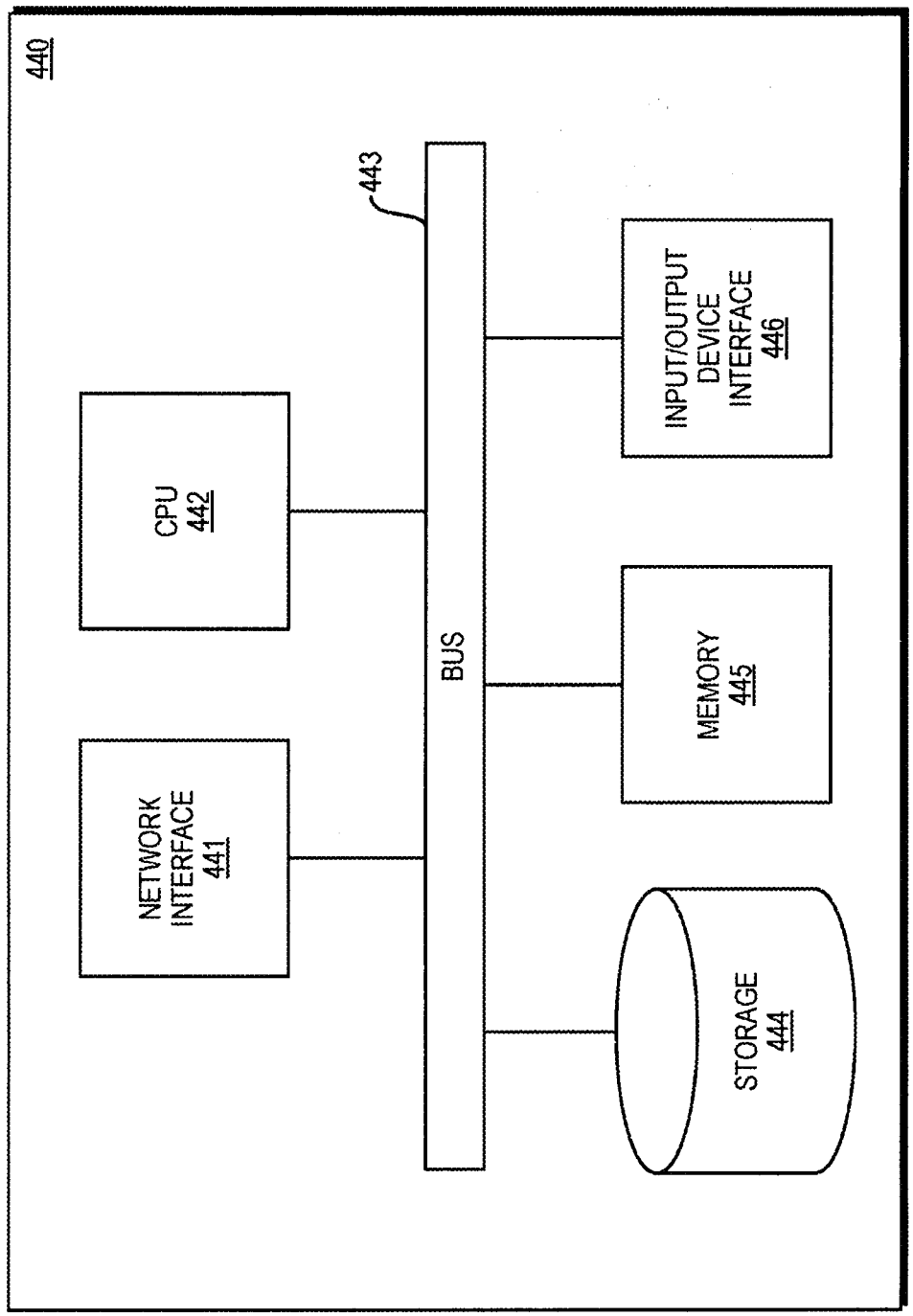
FIG. 4 is a simplified block diagram of a computer system for generating a model of a material according to an embodiment.

FIG. 4 is a simplified block diagram of a computer-based system 440 that may be used to build a model of a subject material (or material of interest) according to any variety of the embodiments of the present invention described herein. The system 440 comprises a bus 443. The bus 443 serves as an interconnect between the various components of the system 440. Connected to the bus 443 is an input/output device interface 446 for connecting various input and output devices such as a keyboard, mouse, touch screen, display, speakers, etc. to the system 440. A central processing unit (CPU) 442 is connected to the bus 443 and provides for the execution of computer instructions. Memory 445 provides volatile storage for data used for carrying out computer instructions. Storage 444 provides non-volatile storage for software instructions, such as an operating system (not shown). The system 440 also comprises a network interface 441 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 440, or a computer network environment such as the computer environment 550, described herein below in relation to FIG. 5. The computer system 440 may be transformed into the machines that execute the methods described herein, for example, by loading software instructions implementing method 100 into either memory 445 or non-volatile storage 444 for execution by the CPU 442. One of ordinary skill in the art should further understand that the system 440 and its various components may be configured to carry out any embodiments or combination of embodiments of the present invention described herein. Further, the system 440 may implement the various embodiments described herein utilizing any combination of hardware, software, and firmware modules operatively coupled, internally or externally, to the system 440.

Figure 5:
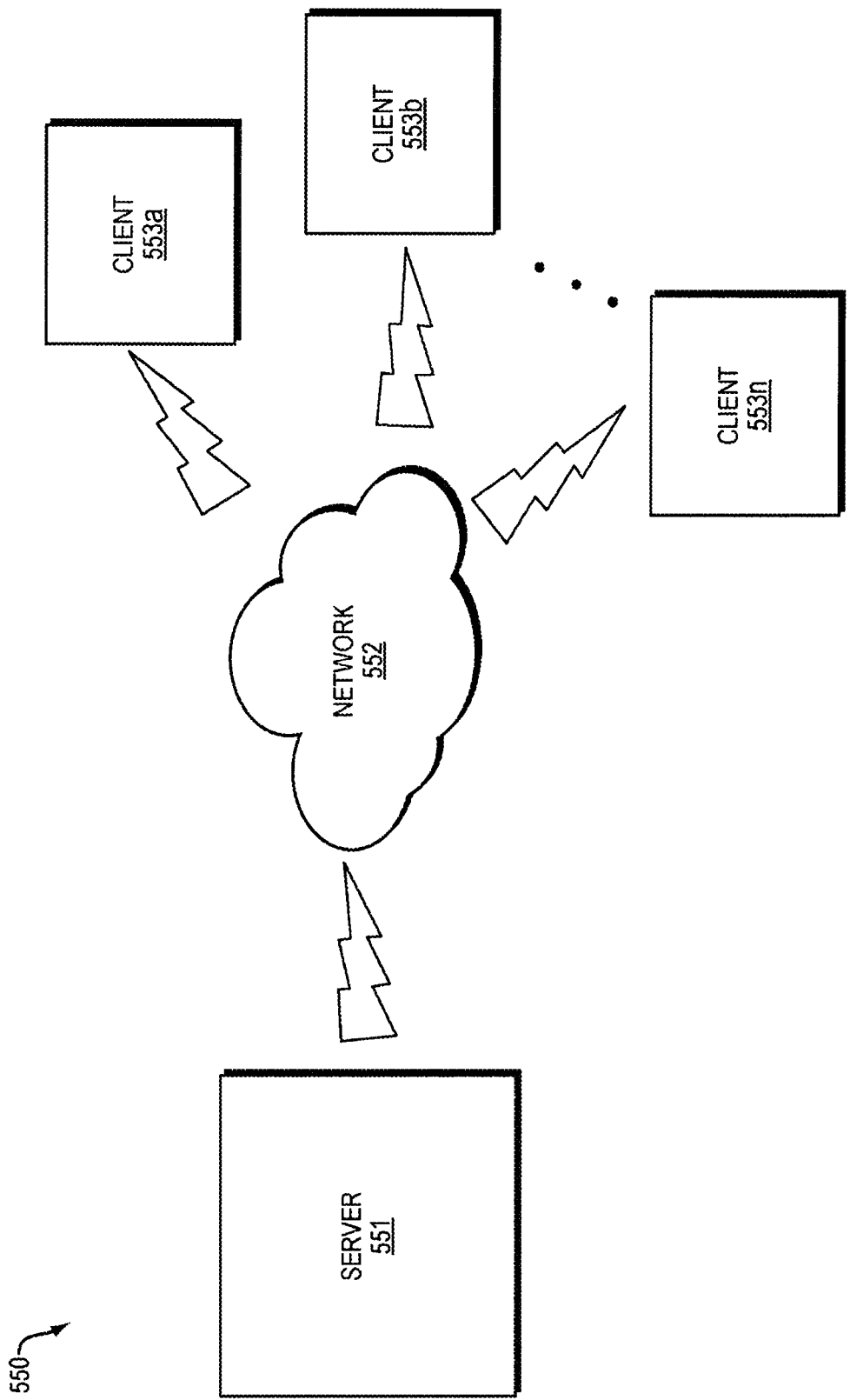
FIG. 5 is a simplified block diagram of a computer network environment in which embodiments of the present invention may be implemented.

FIG. 5 illustrates a computer network environment 550 in which an embodiment of the present invention may be implemented. In the computer network environment 550, the server 551 is linked through the communications network 552 to the clients 553a-n. The environment 550 may be used to allow the clients 553a-n, alone or in combination with the server 551, to execute any of the embodiments described herein. For non-limiting example, computer network environment 550 provides cloud computing embodiments, software as a service (SAAS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

While example embodiments have been particularly shown and described, it will be understood by those skilled in the art that various changes in form and details may be made therein without departing from the scope of the embodiments encompassed by the appended claims.

What is claimed is:

1. A computer implemented method of generating a computer-based model of a material, the method comprising, by a processor:
    selecting a closed volume sub-section of a computer-based model representing a unit of a material;
    estimating at least one physical property of the computer-based model based upon a proposed modification to the selected closed volume sub-section of the computer-based model and a proposed modification to a remainder of the computer-based model representing the unit of material, wherein the estimating includes:
        updating the computer-based model in accordance with the proposed modification to the selected closed volume sub-section and the proposed modification to the remainder of the computer-based model by:
            filling the selected closed volume sub-section of the computer-based model with beads representing material of the closed volume sub-section; and
            filling the remainder of the computer-based model representing the unit of material with beads representing material of the remainder; and
        estimating the at least one physical property by computing the at least one physical property using the updated computer-based model; and
    iterating the selecting and estimating until the estimated at least one physical property conforms to a user specification of the at least one physical property.

2. The method of claim 1 wherein the beads filling the selected closed volume sub-section represent a solid.

3. The method of claim 1 wherein the beads filling the remainder represent a fluid.

4. The method of claim 1 wherein the closed volume sub-section is composed of a first closed volume and a second closed volume encompassing the first closed volume and wherein, filling the selected closed volume sub-section of the computer-based model with beads representing material of the closed volume sub-section includes:
    filling the first closed volume with beads representing material of the first closed volume; and
    filling the second closed volume with beads representing material of the second closed volume.

5. The method of claim 4 wherein the beads filling the second closed volume represent a coating encompassing the first closed volume.

6. The method of claim 1 wherein the at least one physical property of the computer-based model is estimated using a template.

7. The method of claim 1 wherein the unit is a three-dimensional (3D) repeat unit.

8. The method of claim 7 wherein the 3D repeat unit is cubic or rectangular.

9. The method of claim 1 wherein the closed volume is a sphere, cylinder, or ellipsoid.

10. The method of claim 1 wherein the at least one physical property is at least one of: porosity and tortuosity.

11. A system for generating a computer-based model of a material, the system comprising:
    a processor; and
    a memory with computer code instructions stored thereon, the processor and the memory, with the computer code instructions, being configured to cause the system to:
        select a closed volume sub-section of a computer-based model representing a unit of a material;
        estimate at least one physical property of the computer-based model based upon a proposed modification to the selected closed volume sub-section of the computer-based model and a proposed modification to a remainder of the computer-based model representing the unit of material, wherein the estimating includes:
            updating the computer-based model in accordance with the proposed modification to the selected closed volume sub-section and the proposed modification to the remainder of the computer-based model by:
                filling the selected closed volume sub-section of the computer-based model with beads representing material of the closed volume sub-section; and
                filling the remainder of the computer-based model representing the unit of material with beads representing material of the remainder; and
            estimating the at least one physical property by computing the at least one physical property using the updated computer-based model; and
        iterate the selecting and estimating until the estimated at least one physical property conforms to a user specification of the at least one physical property.

12. The system of claim 11 wherein the beads filling the closed volume sub-section represent a solid and the beads filling the remainder represent a liquid or gas.

13. The system of claim 11 wherein the closed volume sub-section is composed of a first closed volume and a second closed volume encompassing the first closed volume and where, to fill the selected closed volume sub-section of the computer-based model with beads representing material of the closed volume sub-section, the processor and the memory, with the computer code instructions, are further configured to cause the system to:
    fill the first closed volume with beads representing material of the first closed volume; and
    fill the second closed volume with beads representing material of the second closed volume.

14. The system of claim 13 wherein the beads filling the second closed volume represent a coating encompassing the first closed volume.

15. The system of claim 11 wherein the processor and the memory, with the computer code instructions, are configured to cause the system to estimate the at least one physical property of the computer-based model using a template.

16. The system of claim 11 wherein the at least one physical property is at least one of: porosity and tortuosity.

17. A non-transitory computer program product for generating a computer-based model of a material, the computer program product executed by a server in communication across a network with one or more clients and comprising:
- a computer readable medium, the computer readable medium comprising program instructions, which, when executed by a processor, causes the processor to:
  - select a closed volume sub-section of a computer-based model representing a unit of a material;
  - estimate at least one physical property of the computer-based model based upon a proposed modification to the selected closed volume sub-section of the computer-based model and a proposed modification to a remainder of the computer-based model representing the unit of material, wherein the estimating includes:
    - updating the computer-based model in accordance with the proposed modification to the selected closed volume sub-section and the proposed modification to the remainder of the computer-based model by:
      - filling the selected closed volume sub-section of the computer-based model with beads representing material of the closed volume sub-section; and
      - filling the remainder of the computer-based model representing the unit of material with beads representing material of the remainder; and
    - estimating the at least one physical property by computing the at least one physical property using the updated computer-based model; and
  - iterate the selecting and estimating until the estimated at least one physical property conforms to a user specification of the at least one physical property.

* * * * *